(12) United States Patent
Mary et al.

(10) Patent No.: US 10,014,669 B2
(45) Date of Patent: Jul. 3, 2018

(54) PLUGGABLE ELECTRICAL DEVICE FOR SWITCHING AN ELECTRICAL CURRENT HAVING AN IMPROVED BACKPLATE

(71) Applicant: Schneider Electric Industries SAS, Rueil Malmaison (FR)

(72) Inventors: Michael Mary, Saint Martin d'Heres (FR); Eric Pinero, Seyssinet-Pariset (FR); Brice Jacolin, Coublevie (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 15/479,907

(22) Filed: Apr. 5, 2017

(65) Prior Publication Data
US 2017/0302061 A1 Oct. 19, 2017

(30) Foreign Application Priority Data

Apr. 15, 2016 (FR) ...................................... 16 53362

(51) Int. Cl.
| | | |
|---|---|---|
| H02B 11/02 | (2006.01) | |
| H02B 11/133 | (2006.01) | |
| H01R 33/955 | (2006.01) | |
| H01R 13/05 | (2006.01) | |

(52) U.S. Cl.
CPC ............. *H02B 11/02* (2013.01); *H01R 13/05* (2013.01); *H01R 33/955* (2013.01)

(58) Field of Classification Search
CPC ....... H02B 11/02; H02B 11/133; H02B 11/24; H02B 11/04; H02B 11/127
USPC ...................... 200/50.21–50.27; 361/600–626
See application file for complete search history.

(56) References Cited

U.S. PATENT DOCUMENTS

| | | | |
|---|---|---|---|
| 3,170,092 A | | 2/1965 | Adams et al. |
| 4,205,207 A | | 5/1980 | Clausing |
| 4,486,815 A | * | 12/1984 | Takahashi ................ H02B 1/21 200/50.22 |
| 6,242,702 B1 | | 6/2001 | Spiegel et al. |
| 8,228,225 B1 | * | 7/2012 | Ledbetter ................ H02B 3/00 200/50.24 |
| 2012/0293951 A1 | * | 11/2012 | Jai ...................... H05K 7/20727 361/679.53 |
| 2013/0180838 A1 | * | 7/2013 | Ahlert .................... H01H 21/22 200/400 |

(Continued)

FOREIGN PATENT DOCUMENTS

| | | |
|---|---|---|
| DE | 3328785 A1 | 2/1985 |
| WO | WO 01/33682 A1 | 5/2001 |

OTHER PUBLICATIONS

French Preliminary Search Report dated Dec. 7, 2016 in French Application 16 53362 filed on Apr. 15, 2016 (with English Translation of Categories of Cited Documents).

*Primary Examiner* — Gary Paumen
(74) *Attorney, Agent, or Firm* — Oblon, McClelland, Maier & Neustadt, L.L.P.

(57) ABSTRACT

A pluggable electrical device for switching an electrical current includes a static frame including a rigid backplate fastened to the frame; connection terminals able to be connected to an electrical installation; and a removable portion including a device for switching an electrical current. The backplate is made of a thermosetting polymer and includes reinforcing beams integrated into the backplate and extending in a vertical direction.

13 Claims, 4 Drawing Sheets

(56) References Cited

U.S. PATENT DOCUMENTS

2013/0194059 A1* 8/2013 Parr ........................ H02B 1/52
                                                          336/65

* cited by examiner

PLUGGABLE ELECTRICAL DEVICE FOR SWITCHING AN ELECTRICAL CURRENT HAVING AN IMPROVED BACKPLATE

The present invention relates to a pluggable electrical device for switching an electrical current having an improved backplate.

Electrical devices for switching an electrical current, such as circuit breakers or switch disconnectors, that include a static frame (i.e. a fixed chassis) that is able to be mounted in a switchboard and a removable portion, also called the "breaking unit", that contains an electrical switching device able to switch an electrical current, are already known. The removable portion is movable between plugged-in and unplugged positions with respect to the frame. Such an electrical device is also said to be pluggable.

In the plugged-in position, the removable portion is received in the interior of a housing of the static frame provided for this purpose, thus allowing the electrical switching device to be electrically connected to connection terminals of an electrical installation, which terminals are connected to the frame. In the unplugged position, the removable portion is at least partially removed from the housing of the frame. The electrical switching device is then no longer connected to the electrical installation. Typically, the device operates only when it is in the plugged-in position.

These pluggable devices facilitate maintenance and repair operations, because the removable portion may be removed by an operator without there being any need to touch or demount the connections between the frame and the electrical installation.

Such an electrical device is for example known from WO-01/33682-A1.

In this device, the removable portion includes a backplate, made from a composite material obtained by pultrusion. The role of this backplate is to ensure that the electrical device has a good mechanical strength and to resist the static and dynamic mechanical stresses to which the device is subjected when it is in operation.

For example, in the plugged-in position, the removable portion is subjected to static stresses due to the weight of the electrical connectors, typically sets of bus bars made of copper, which serve to connect the electrical device to the electrical installation. The removable portion is also subject, during the interruption of the current, to brief mechanical stresses generated under the effect of the electromagnetic forces that appear during the switching of an electrical current. These forces are particularly high in devices of high breaking power, for example devices intended to switch currents greater than 100 kA, in which they may generate mechanical stresses equivalent to those exerted by a weight of several tonnes. This weakens the backplate and may even destroy it, thereby degrading the operation of the electrical device.

However, this known prior-art backplate is not entirely satisfactory. The pultrusion manufacturing process has the drawback of being complex to implement and has technical limitations. The backplate thus obtained has a high unit cost and a substantial thickness, this implying that the static frame is larger than it needs to be and therefore likewise the bulk of the electrical device.

It is these drawbacks that the invention more particularly intends to remedy, by providing a pluggable electrical device for switching an electrical current, including a backplate that is more economical to manufacture and having a low bulk, while being able to withstand the mechanical stresses exerted on the electrical device during its operation.

For this purpose, the invention relates to a pluggable electrical device for switching an electrical current, including:
- a static frame, including a rigid backplate fastened to the frame;
- connection terminals able to be connected to an electrical installation; and
- a removable portion including a device for switching an electrical current, this removable portion being selectively movable between:
  - a plugged-in position, in which the removable portion is received into the interior of a corresponding housing of the static frame and in which the switching system is electrically connected to the connection terminals, and
  - an unplugged position, in which the removable portion is outside of the housing and in which the switching system is electrically isolated from the connection terminals.

According to the invention, the backplate is made of a thermosetting polymer and includes reinforcing beams integrated into the backplate and extending in a vertical direction.

By virtue of the invention, the backplate has a good mechanical strength, in particular because of the vertical beams, which prevent mechanical stresses from being concentrated in localised areas of the backplate and conversely promote their uniform distribution over the backplate. The latter thus has a mechanical strength that is as satisfactory as with the known pultruded backplates of the prior art. In addition, the backplate may be manufactured in a simplified way, for example by moulding, thereby decreasing its cost and allowing greater freedom in the choice of its dimensions, in particular allowing the bulk thereof to be decreased.

According to advantageous but non-obligatory aspects of the invention, such an electrical device may incorporate one or more of the following features, which may be implemented in any technically possible combination:

- The backplate is fastened to the frame by means of fastening elements, the electrical device furthermore including maintaining strips that extend vertically along the lateral edges of the backplate, the maintaining strips being clamped against the lateral edges by the fastening elements.
- The maintaining strips are made of steel.
- The fastening elements include countersunk-head bolts.
- The fastening elements protrude, with respect to that face of each maintaining strip which is turned toward behind the electrical device, by 3 mm or less.
- The backplate is formed as a single piece.
- The backplate is made from polyester.
- The backplate is produced by moulding.
- The area of the cross section of each of the reinforcing beams is 5 cm$^2$ or more, preferably 10 cm$^2$ or more and more preferably 20 cm$^2$ or more.
- The backplate has a thickness comprised between 0.5 cm and 5 cm.

The invention will be better understood and other advantages thereof will become more clearly apparent in light of the following description of one embodiment of an electrical device, which is given merely by way of example and with reference to the appended drawings, in which.

Figure 1:
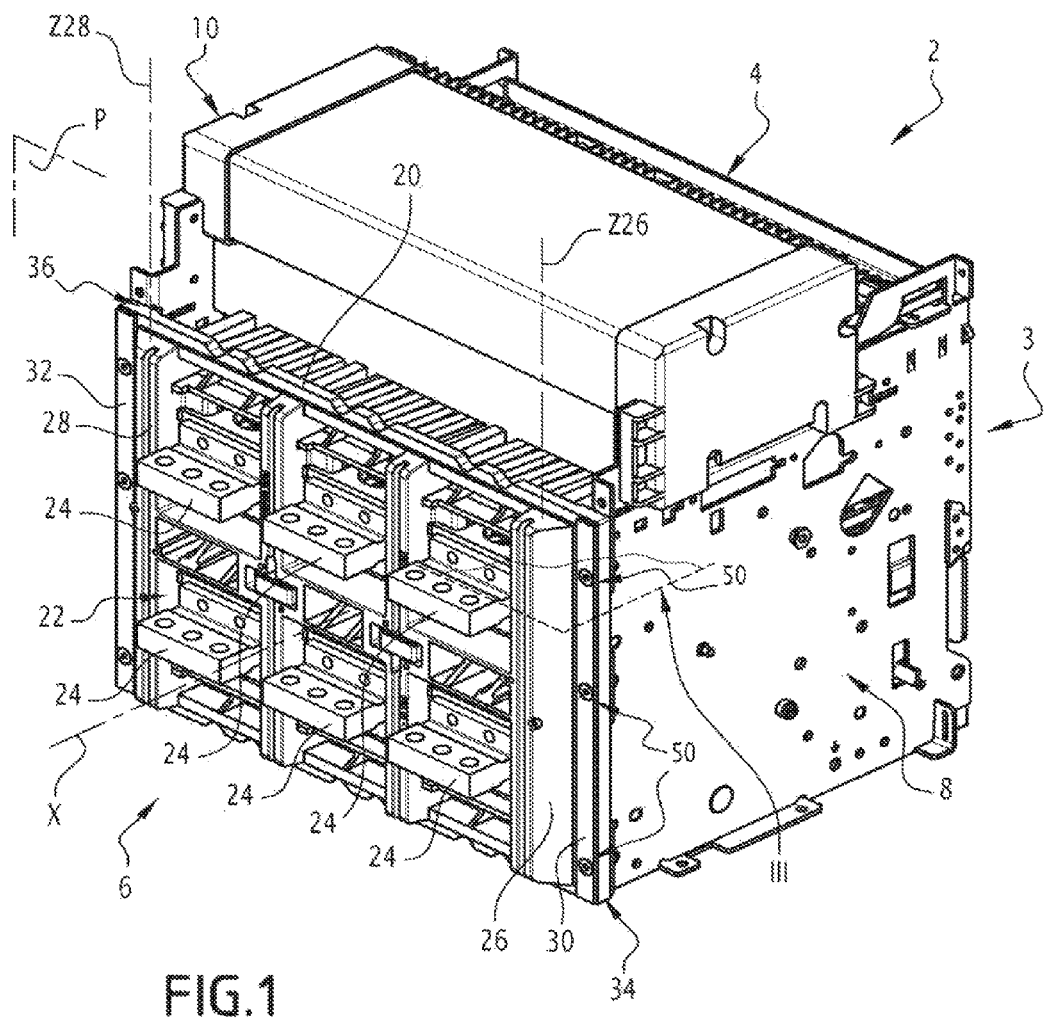
FIG. 1 is a schematic illustration, of a perspective view, of an electrical device for switching an electrical current according to the invention.
Figure 2:
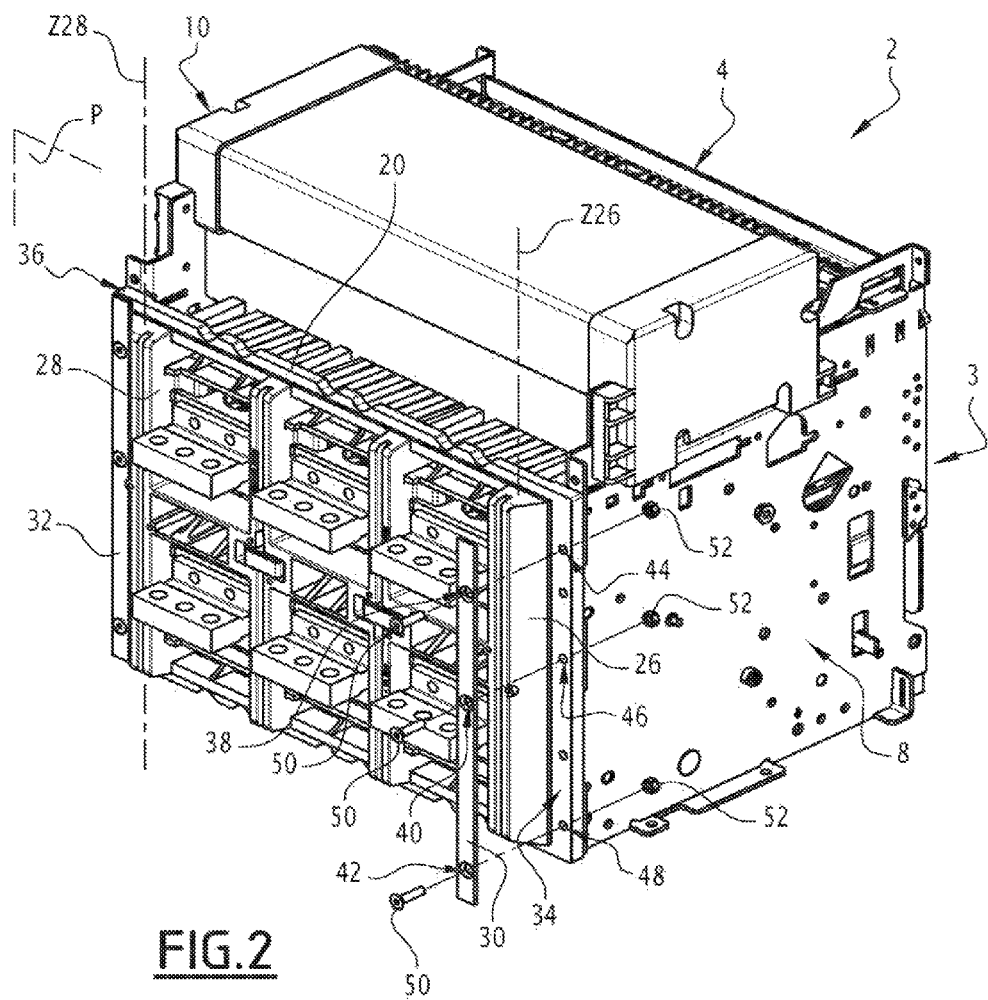
FIG. 2 is a schematic illustration, of a partially exploded perspective view, of the electrical switching device of FIG. 1.

FIGS. 1 and 2 show a pluggable electrical device 2 for switching an electrical current. The electrical device 2 is configured to interrupt an electrical current, in response to an operating anomaly or to a predefined command. For example, the electrical device 2 is a circuit breaker or a switch disconnector.

In this example, the electrical device 2 is a low-voltage AC air circuit breaker, for example intended for an electrical voltage higher than or equal to 440 V and for electrical currents higher than 630 A. The short-circuit breaking power of this circuit breaker is 150 kA at 440 V. The electrical device 2 is here multipolar, i.e. able to operate with a multiphase electrical installation, for example one with three or four poles. As a variant, the circuit breaker is a DC circuit breaker.

The electrical device 2 includes a static frame 3 and a removable portion that is not illustrated.

The frame 3 includes a front face 4, a back face 6 and lateral faces 8 and 10. In this example, the shape of the frame 3 is that of a rectangular-based prism. The lateral walls 8 and 10 are here planar and parallel to each other. The frame 3 defines a housing for receiving the movable portion of the electrical device 2 by means of an aperture in the front face 4. A longitudinal axis of the electrical device 2, which extends horizontally and parallelly to the lateral faces 8 and 10 and perpendicularly to the front and back faces 4 and 6, is labelled "X".

In this description, the vertical direction is defined with respect to the direction of the Earth's gravity. The forces due to the weights of various elements therefore act on the electrical device 2 in this vertical direction, in particular when the electrical device 2 is in a configuration mounted in a switchboard.

The back face 6 includes a backplate 20, which is fastened to the frame 3, and electrical connection terminals 24 of the electrical device 2, which are arranged level with the backplate 20. The backplate 20 is described in more detail below.

The connection terminals 24 are intended to be electrically connected to an electrical installation, for example by way of a set of connecting bus bars in a switchboard. The electrical installation is for example an electrical circuit that it is desired to protect or control by means of the electrical device 2. The connection terminals 24 are made of an electrically conductive material, such as copper.

The removable portion is selectively movable between plugged-in and unplugged positions. In the plugged-in position, it is received in the interior of the housing defined by the frame 3 and is connected to the connection terminals 24. In the unplugged position, the movable portion is outside of the housing defined by the frame 3. The device for switching current is disconnected from the connection terminals 24. The movement of the removable portion between its plugged-in and unplugged positions is achieved by translation along the axis X.

The removable portion may furthermore have, although it is not indispensable, a third position, called the test position, which is intermediate between the plugged-in and unplugged positions. In this test position, the removable portion is only partially received in the interior of the housing defined by the frame 3, but the device for switching current is disconnected from the connection terminals 24.

The removable portion includes a device for switching an electrical current (not illustrated), which is able and intended to selectively interrupt an electrical current flowing between connection terminals 24 of a given pole when the removable portion is in the plugged-in position. Examples of a removable portion of the electrical device 2 are described in FR 2 783 366 A1 and in FR 2 777 696 A1.

The function of the backplate 20 is to increase the mechanical strength of the frame 3, in particular in order to allow the latter to withstand the stresses exerted level with the electrical connection terminals 24. The backplate 20 has a section of planar shape that lies in a static vertical geometric plane P. Here, the plane P is perpendicular to the axis X and to the lateral walls 8 and 10.

The backplate 20 is rigid and is made of a thermosetting polymer, for example polyester. By "rigid", what is meant is that the flexural modulus of the backplate 20 is higher than or equal to 9.5 GPa.

Here, the backplate 20 is a single piece. Preferably, the backplate 20 is produced by moulding. Thus, the backplate 20 is easy to manufacture and has a low unit cost while nonetheless having good mechanical strength properties.

By way of illustrative example, the backplate 20 has a thickness comprised between 5 mm and 50 mm and preferably comprised between 8 mm and 15 mm. The thickness of the backplate 20 is measured parallelly to the axis X, level with the planar section of this backplate 20, for example on one edge of this backplate 20. The backplate 20 has a width of 440 mm, measured in the plane P perpendicularly to the axis X, and a height of 330 mm, measured vertically in the plane P.

Here, the backplate 20 is provided, in a central zone, with a plurality of through-apertures 22, through which the connection terminals 24 exit from the frame 3 at the rear of the electrical device 2. In this example, the connection terminals 24 are arranged in pairs. The connection terminals 24 of each pair are placed vertically with respect to one another. The pairs of connection terminals 24 are aligned horizontally along the back face 6. Each pair of connection terminals 24 corresponds to one electrical pole of the circuit breaker.

The backplate 20 also includes reinforcing beams 26 and 28, which are integrated into the backplate 20, in order to increase the mechanical strength of the backplate 20. The reinforcing beams 26 and 28 are integrated into the backplate 20 and protrude with respect to the planar section of the backplate 20, toward behind the backplate 20. These reinforcing beams 26, 28 extend longitudinally along vertical axes, which have been labelled Z26 and Z28, respectively. The reinforcing beams 26 and 28 are here placed on either side of the central zone of the backplate 20 containing the apertures 22.

The reinforcing beams 26 and 28 are here identical. Thus, below, only the reinforcing beam 26 is described in detail.

Figure 3:
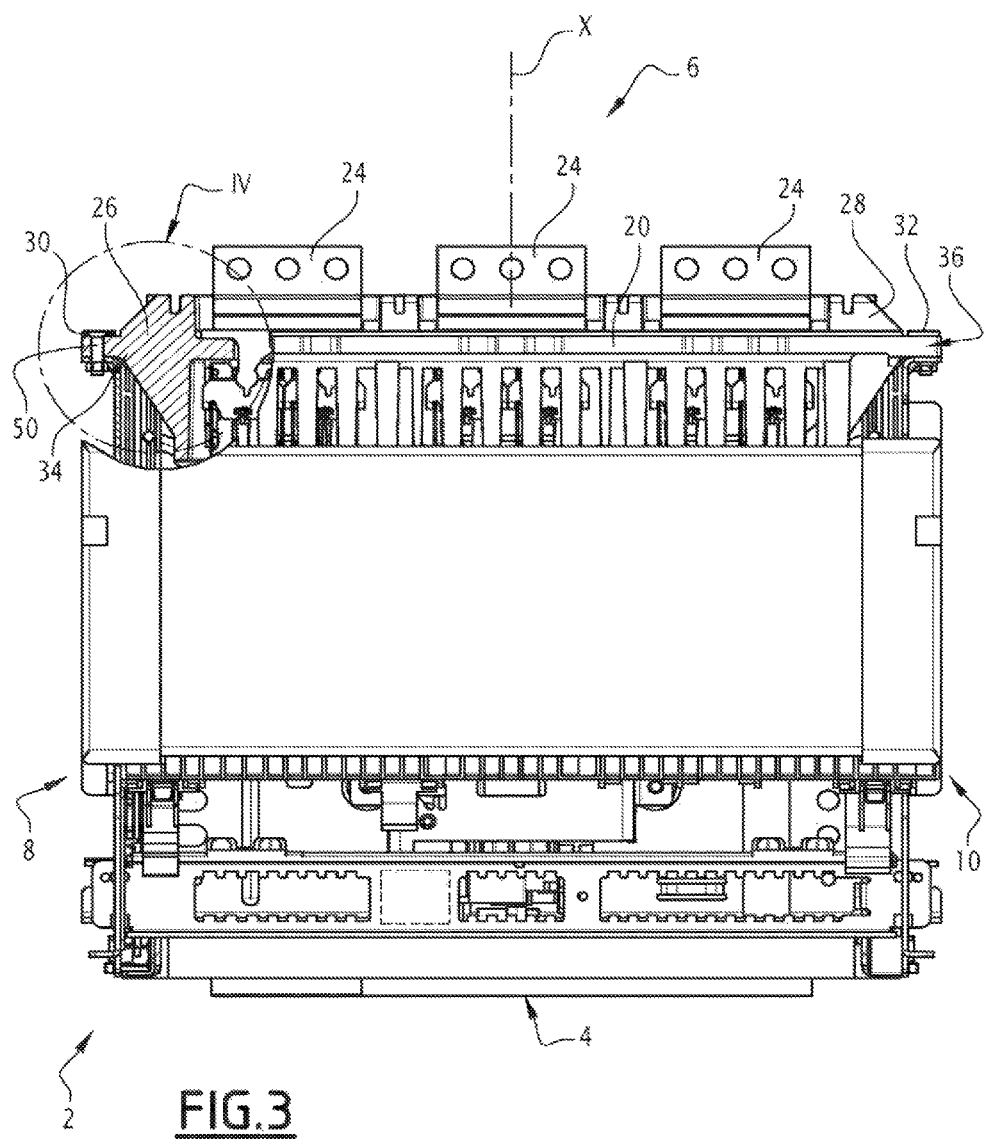
FIG. 3 is a schematic illustration, of a partially cutaway representation, of the electrical device of FIGS. 1 and 2, seen in the cross-sectional plane III of FIG. 1.
Figure 4:
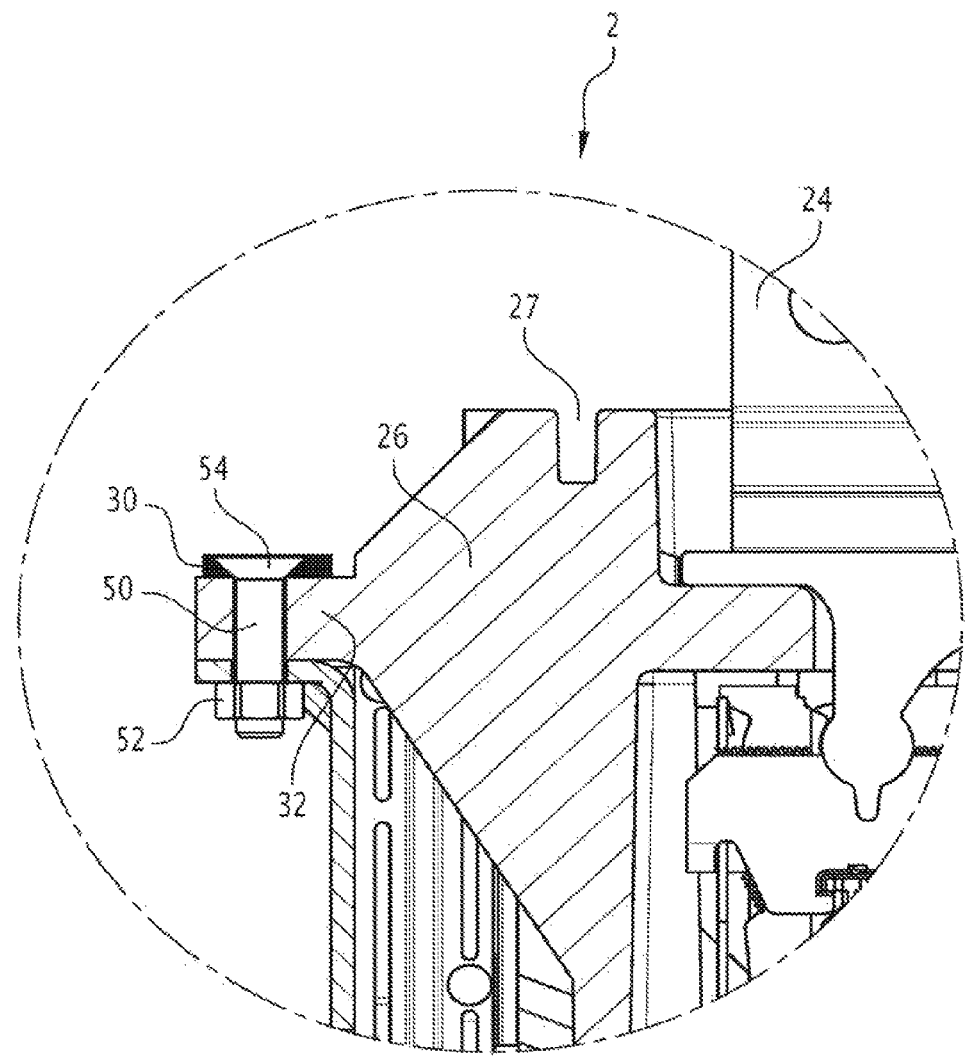
FIG. 4 is a detailed view of the zone IV of FIG. 3.

As illustrated in FIGS. 3 and 4, the reinforcing beam 26 has a transverse cross-sectional area of 5 cm$^2$ or more, preferably of 10 cm$^2$ or more and more preferably of 20 cm$^2$ or more. In this example, this transverse cross section has an essentially polygonal shape that for example is inscribed inside a trapezium. The transverse cross-sectional area is here measured in a horizontal geometric plane perpendicular to the axis Z26.

Preferably, the shape of the reinforcing beam 26 is such that its transverse cross section has no sharp edges, i.e. no edges such that the angle between two consecutive edges, measured in the transverse plane and on the inside of the reinforcing beam 26, is 60° or less or, preferably, 45° or less. Specifically, such sharp edges promote the appearance of points of mechanical rupture when the reinforcing beam 26 is subjected to a mechanical stress, especially a compressive stress in the Z26 direction. In the absence of such sharp edges, the fragility of the reinforcing beam 26 is low.

The reinforcing beams 26 and 28 make it possible to ensure that, when the electrical device 2 is mounted in a switchboard, the backplate 20 has a satisfactory mechanical strength in order not only to withstand static stresses, for example due to the weight the sets of connecting bus bars exerted on the connection terminals 24, but also to withstand the electrodynamic stresses generated when the switching device interrupts the flow of an electrical current.

Advantageously, the reinforcing beam 26 is provided with a groove 27 that extends along the reinforcing beam 26, i.e. along the direction Z26. This groove 27 here has a width of 5 mm, measured horizontally in the plane P, and a depth of 8 mm, measured parallelly to the axis X.

The backplate 20 is fastened to the frame 3, securely and with no degree of freedom, by means of fastening elements, which are described in more detail below.

The electrical device 2 also includes maintaining strips 30, 32 that are placed level with the back face of the backplate 20. More precisely, the maintaining strips 30, 32 are each placed on lateral edges 34, 36 of the backplate 20. Here, the maintaining strip 30 is placed on a lateral edge 34 of the backplate 20 located on the same side as the lateral wall 8. Analogously, the back strip 32 is placed on the lateral edge 36 of the backplate 20, i.e. the edge located on the same side as the lateral wall 10.

The maintaining strips 30 and 32 play the same role with respect to the lateral edges 34 and 36, respectively. Thus, only the maintaining strip 30 is described in detail below.

The maintaining strip 30 has an oblong shape extending vertically parallelly to the axis Z26. Here, the maintaining strip 30 has a rectangular parallelepipedal shape, the length of which extends in the direction of the height of the backplate 20. By way of illustration, the maintaining strip 30 has a height of 330 mm, measured vertically in the plane P and a width of 10 mm, measured horizontally in the plane P.

In a mounted configuration of the electrical device 2, the maintaining strips 30 and 32 are clamped in contact against the respective lateral edges 34, 36 by means of fastening elements.

In this example, the backplate 20 is bolted to the frame 3. Each fastening element includes a nut and bolt assembly consisting of a bolt 50 and a corresponding nut 52. As a variant, the fastening elements are different, for example rivets.

The maintaining strip 30 is provided with a plurality of through-orifices 38, 40, 42. Likewise, the lateral edge 34 is provided with a plurality of through-orifices 34, 46 and 48. When the maintaining strip 30 is in position mounted on the lateral edge 34, the orifices 38, 40 and 42 are aligned with the corresponding orifices 44, 46, 48 of the lateral edge 34, respectively. Preferably, the orifices 38, 40 and 42 of the maintaining strip 30 and the orifices 44, 46, 48 of the lateral edge 34 have the same diameter. The lateral wall 8 has a bent edge provided with orifices that are aligned with the orifices 38, 40 and 42 of the maintaining strip 30 and with the orifices 44, 46, 48 of the lateral edge 34. Each bolt 50 is inserted into one of the aligned orifices 38 and 44, 40 and 46 or 42 and 48 of the maintaining strip 30, and into one orifice of the bent edge of the lateral wall 8, and is maintained clamped by one of the corresponding nuts 52, as illustrated in FIGS. 1 and 2. As a variant, the number of orifices in the maintaining strip 30, on the lateral edge 34 and on the bent edge of the lateral wall 8 may be different.

When the device is in the mounted configuration, fastening elements, here the bolts 50 and the nuts 52, exert a clamping force on the maintaining strip 30 and 32 and on the lateral edges 34 and 36 of the backplate 20. Thus, the backplate 20 is clamped, level with its lateral edges 34 and 36, between the maintaining strips 30 and 32 and the corresponding bent edges of the lateral walls 8 and 10, respectively. For example, the bolts 50 exert a clamping force of 5 N·m or more.

In this way, the clamping force of the fastening elements, here bolts 50 and nuts 52, is distributed over the entire extent of the lateral edges 34 and 36. The maintaining strips 30 and 32 thus promote a good distribution of the mechanical stresses applied to the backplate 20. A concentration of mechanical stresses at certain localised points of the backplate 20 is therefore avoided, something that would have a detrimental effect on the strength of the backplate 20 and that would promote premature mechanical rupture.

Advantageously, each of the bolts 50 has a countersunk-head 54. In this way, the head 54 does not protrude from the maintaining strip 30 and the thickness thereof that sticks out when the bolt 50 is in the mounted configuration in the device 2 is minimised. For example, the separation, or distance, between the distal end of the head 54 and the back face of the maintaining strip 30, measured parallelly to the axis X, is 3 mm or less, preferably 1 mm or less and even more preferably 0.5 mm or less. The back face of the maintaining strip 30 is the face that is turned toward outside the electrical device 2.

Such an arrangement is particularly advantageous. Specifically, typically, in switchboards, it is conventional to use planar surfaces of the back face of the electrical devices to fasten thereto barriers that protrude away from and behind the electrical devices. In the present case, such barriers are preferably placed on the planar surfaces of the lateral edges 34, 36 of the device 2.

The function of these barriers is to separate from one another the electrical devices installed in a given switchboard, in order to protect operators when they are working on a given device from accidental contact with those electrical terminals of neighbouring devices which are under voltage. Such barriers also serve to confine electric arcs in the case of electrical faults and to limit their propagation between neighbouring electrical devices in the switchboard.

When the head 54 is not countersunk, there is a high risk that it will protrude from the maintaining strip 30, this meaning a thickness thereof will stick out with respect to the maintaining strip 30, and prevent the seal-tight installation of such a barrier. There is then a large gap between the base of the barrier and the maintaining strip 30, so that an electric arc may pass through this gap, in particular during the ejection of a breaking gas from the electrical device 2. This therefore decreases the effectiveness and utility of such a barrier.

As a variant, when the fastening element is a rivet, its head will preferably be arranged once again to prevent any thereof sticking out with respect to the maintaining strip 30, with the same aim.

In this example, the maintaining strips 30, 32 are made of a metal such as steel. For example, a strip according to standard NF EN 10139 of the steel alloy referenced "DC03 C490" is used.

The embodiments and variants envisaged above may be combined together to generate new embodiments.

The invention claimed is:

1. A pluggable electrical device for switching an electrical current, the electrical device comprising:
   a static frame, including a rigid backplate fastened to the static frame;
   connection terminals connectable to an electrical installation;
   a removable portion including a switching device for switching the electrical current, said removable portion being selectively movable between:
      a plugged-in position, in which the removable portion is received into an interior of a corresponding housing of the static frame and in which the switching device is electrically connected to the connection terminals, and
      an unplugged position, in which the removable portion is outside of the housing and in which the switching device is electrically isolated from the connection terminals; and
   a maintaining strip that is clamped against a lateral edge of the backplate by a fastening element, the fastening element fastening the backplate to the frame,
   wherein the backplate is made of a thermosetting polymer and includes reinforcing beams integrated into the backplate and extending in a vertical direction.

2. The electrical device according to claim 1, wherein the backplate is fastened to the static frame with fastening elements, which include the fastening element, the electrical device including maintaining strips, which include the maintaining strip and extend vertically along lateral edges, which include the lateral edge, of the backplate, the maintaining strips being clamped against the lateral edges by the fastening elements.

3. The electrical device according to claim 2, wherein the maintaining strips are made of steel.

4. The electrical device according to claim 2, wherein the fastening elements include countersunk-head bolts.

5. The electrical device according to claim 2, wherein the fastening elements protrude, with respect to a face of each maintaining strip, which is turned toward behind the electrical device, by 3 mm or less.

6. The electrical device according to claim 1, wherein the backplate is formed as a single piece.

7. The electrical device according to claim 1, wherein the backplate is made from polyester.

8. The electrical device according to claim 1, wherein the backplate is produced by moulding.

9. The electrical device according to claim 1, wherein an area of a cross section of each of the reinforcing beams is 5 $cm^2$ or more.

10. The electrical device according to claim 1, wherein the backplate has a thickness comprised between 0.5 cm and 5 cm.

11. The electrical device according to claim 1, wherein an area of a cross section of each of the reinforcing beams is 10 $cm^2$ or more.

12. The electrical device according to claim 1, wherein an area of a cross section of each of the reinforcing beams is 20 $cm^2$ or more.

13. An electrical device comprising:
   a frame that includes a backplate fastened thereto;
   connection terminals connectable to an electrical installation; and
   a removable portion including a switching device for switching an electrical current, the removable portion being selectively movable between:
      a plugged-in position, in which the removable portion is received into an interior of a corresponding housing of the frame and in which the switching device is electrically connected to the connection terminals, and
      an unplugged position, in which the removable portion is outside of the housing and in which the switching device is electrically isolated from the connection terminals, wherein
   the backplate is made of a thermosetting polymer and includes reinforcing beams integrated into the backplate and extending in a vertical direction, and
   the backplate is fastened to the frame with fastening elements, the electrical device including maintaining strips that extend vertically along lateral edges of the backplate, the maintaining strips being clamped against the lateral edges by the fastening elements.

* * * * *